US009518869B2

(12) United States Patent
Bruyant et al.

(10) Patent No.: US 9,518,869 B2
(45) Date of Patent: Dec. 13, 2016

(54) ELECTRONIC METHOD FOR EXTRACTING THE AMPLITUDE AND PHASE OF A SIGNAL IN A SYNCHRONOUS DETECTOR AND APPLICATION THEREOF IN INTERFEROMETRIC CIRCUITS

(71) Applicant: UNIVERSITE DE TECHNOLOGIE DE TROYES, Troyes (FR)

(72) Inventors: Aurelien Pierre Bruyant, Troyes (FR); Julien Vaillant, Saint-Savine (FR); Abeer Al Mohtar, Troyes (FR)

(73) Assignee: UNIVERSITE DE TECHNOLOGIES DE TROYES (FR)

( * ) Notice: Subject to any disclaimer, the term of this patent is extended or adjusted under 35 U.S.C. 154(b) by 0 days.

(21) Appl. No.: 14/313,990

(22) Filed: Jun. 24, 2014

(65) Prior Publication Data
US 2015/0070704 A1 Mar. 12, 2015

(30) Foreign Application Priority Data
Sep. 11, 2013 (FR) ...................................... 13 58723

(51) Int. Cl.
*G01J 9/02* (2006.01)
*G01B 9/02* (2006.01)
*G06F 17/10* (2006.01)

(52) U.S. Cl.
CPC ............. *G01J 9/02* (2013.01); *G01B 9/02002* (2013.01); *G01B 9/02041* (2013.01); *G06F 17/10* (2013.01)

(58) Field of Classification Search
CPC ............................... G01B 9/02041; G01J 9/02
See application file for complete search history.

(56) References Cited

U.S. PATENT DOCUMENTS

4,820,047 A * 4/1989 Snyder ........................ 356/484
2007/0055117 A1* 3/2007 Alphonse ..................... 600/310
(Continued)

Primary Examiner — Tarifur Chowdhury
Assistant Examiner — Omar Nixon (57) ABSTRACT

The invention concerns an electronic method for extracting the amplitude $E_S$ and the phase $\phi_S$ of an electrical signal in a synchronous detector, the signal containing a modulated part $I_{mod}$ of the form $I_{mod} \propto E_S f(t)*\cos(\phi_S-\phi_R(t))$, where $\phi_R(t)$ and $f(t)$ are two known temporal modulation functions. The method comprises the following steps: multiplying the signal by two reference signals $C(t)$ and $S(t)$ constructed from $\phi_R(t)$ and $f(t)$; integrating the resulting signals over a time $t_{int}$; determining the amplitude and phase of said signal from the quantities X and Y resulting from the previous integrations. The method is characterised in that: said electrical signal is multiplied by $C(t)$ and $S(t)$ that can be decomposed on the same set of frequencies as those present in $I_{mod}$. The invention also concerns the application of the above method in interferometric circuits and the use and execution of the above method.

20 Claims, 5 Drawing Sheets

(56) References Cited

U.S. PATENT DOCUMENTS

| | | | |
|---|---|---|---|
| 2010/0220568 A1* | 9/2010 | Shaver | 369/53.11 |
| 2011/0242542 A1* | 10/2011 | Maity et al. | 356/450 |
| 2013/0047303 A1* | 2/2013 | King et al. | 850/56 |

* cited by examiner

ELECTRONIC METHOD FOR EXTRACTING THE AMPLITUDE AND PHASE OF A SIGNAL IN A SYNCHRONOUS DETECTOR AND APPLICATION THEREOF IN INTERFEROMETRIC CIRCUITS

CROSS-REFERENCE TO RELATED APPLICATION

This application is based on French Patent Application No. FR 13 58723, filed Sep. 11, 2013, the disclosure of which is hereby incorporated by reference thereto in its entirety, and the priority of which is hereby claimed under 35 U.S.C. §119.

TECHNICAL FIELD OF THE INVENTION

The invention relates to the extraction of the amplitude and phase of a modulated signal. More particularly, the invention relates to a method for extracting the amplitude and phase of a signal mixed with a signal modulated in phase according to a periodic modulation function, typically sinusoidal or triangular. This invention concerns typically the measurement of amplitude and phase in interferometric circuits, in particular in the field of integrated optical sensors or phase-resolved optical microscopy.

PRIOR ART

Conventional synchronous detectors (SDs) are electronic instruments that have been very much used for a long time [i] since they make it possible to extract, very effectively, in terms of signal to noise ratio, the amplitude $E_S$ and the phase $\phi_S$ of a signal associated with a sinusoidal carrier of angular frequency $\Omega$. Synchronous detectors are used when the signal the phase and amplitude of which it is sought to measure is weak, or even very weak. Furthermore, in the case of a strong signal, synchronous detectors also constitute a very practical solution for measuring the phase $\phi_S$ (still in the case of a signal associated with a sinusoidal carrier). These instruments are called "lock-in amplifiers".

Synchronous detectors consist of a homodyne detector followed by an integrator. They perform the extraction of the signal by multiplying first the detected electrical signal $I_{det}$ with two sinusoidal references in quadrature (sine and cosine) having the same frequency $\Omega$ as the carrier. The result of this product is integrated over a time $t_{int}$. In practice, the input electrical signal of the SD, $I_{det}$, contains the modulated signal of interest $I_{mod}=E_S \cos(\phi_S-\Omega t)$, and optionally other modulated signals at other frequencies as well as noise. Synchronous detectors (SDs) have two outputs delivering two signals X and Y from which it is easy to obtain $\phi_S$ (the phase) and $E_S$ (the amplitude). The mathematical operation performed by a synchronous detector operating on $I_{det}$ at a "reference" frequency $\Omega$ is written, for each of the two outputs:

$$X_\Omega(I_{det}) = \frac{1}{\Omega t_{int}} \int_0^{\Omega t_{int}} I_{det}\cos(\Omega t)d(\Omega t) \quad (1)$$

$$Y_\Omega(I_{det}) = \frac{1}{\Omega t_{int}} \int_0^{\Omega t_{int}} I_{det}\sin(\Omega t)d(\Omega t). \quad (2)$$

The output X supplies a signal proportional to $E_S*\cos(\phi_S)$ and the output Y supplies a signal identically proportional to $E_S*\sin(\phi_S)$, which gives access to the quantities sought.

The functioning of synchronous detectors is widely documented [ii]. In interferometry, SDs find their application in determining the amplitude and phase of an optical signal interfering with a reference optical signal offset in optical frequency (heterodyne devices, using acousto-optical modulators). This is because this optical mixture produces a detected intensity varying sinusoidally with an angular frequency $\Omega$, which makes the use of an SD appropriate.

However, in many practical cases, the carrier present in $I_{det}$, although stationary, is not purely sinusoidal. This problem is particularly significant in optical interferometry where, very often, the light signal to be analysed interferes with a light signal the phase or optical frequency of which is modulated non-linearly for practical reasons, namely: the speed of the modulation, the amplitude of the modulation, the mechanical constraints, etc. In this case, the detected intensity is dispersed over a set of frequencies rather than over a single one. Because of this multitude of frequencies to be analysed, a single conventional SD cannot generally be used.

The field of interferometric optical sensors is particularly relevant to this problem, "Recovering Signal from Optical Fibre Interferometric Sensors, by Charles B Cameron, PhD thesis, 1991" [iii], for the optical measurement of movement, of vibration. The field of optical microscopy using interferometry is also relevant to this problem, see articles [2, 3, 4]. In these two fields, more or less effective methods are used for getting round the problem of the non-sinusoidal carrier; this is particularly the case when a so-called "pseudo-heterodyne" interferometric method is used [1, 5, 6, 7]. Various approaches have therefore been proposed. Reference can be made to articles [8, 9] in the field of optical fibre sensors, and to articles [3, 4, 10] for microscopy. A fairly "natural" method for dealing with the problem consists of performing the two operations described by equations (1-2) on a sufficient number of frequencies and therefore requires multiple synchronous detectors (SDs). This approach, here referred to as the multiple SD (MSD) method, is described in the article "Pseudoheterodyne detection for background-free near-field spectroscopy, N Ocelic, A Huber and R Hillenbrand, Appl. Phys. Lett. 89, 101124 (2006)" [3] as well as in the international application referenced [13]. Nevertheless, with this method, part of the signal is lost since the signal is distributed over a large number of frequencies, and it is difficult and expensive to use a synchronous detector on each of them. Other methods, more or less complex, may be cited, see articles [11, 12]. However, the MSD approach remains used since not only do SDs make it possible to detect very weak signals, but in addition they make it possible to discriminate the useful signal from other parasitic signals if the signal of interest has a supplementary modulation of its amplitude $E_S$ at a certain known frequency.

DISCLOSURE OF THE INVENTION

The present invention makes it possible to effectively extend the field of application of synchronous detectors to electrical signals modulated by a given non-sinusoidal stationary carrier, known or measured.

The aim of the invention is to remedy the drawbacks of the prior art and concerns more particularly an electronic method for extracting the amplitude $E_S$ and phase $\phi_S$ of an electrical signal $I_{det}$ in a synchronous detector, said electrical signal $I_{det}$ containing a modulated part $I_{mod}$ of the form $I_{mod} \propto E_S$ f(t)*cos($\phi s-\phi_R(t)$), where $\phi_R(t)$ and f(t) are two known temporal modulation functions, comprising the following steps:

multiplying said electrical signal by two reference signals C(t) and S(t) constructed from known temporal modulation functions $\phi_R(t)$ and f(t);
  integrating the two signals resulting from the two multiplications defined at the previous step during a time $t_{int}$,
  determining the amplitude and phase of said signal from the quantities X and Y resulting from the integrations defined at the previous step;
  the method is characterised in that:
  said electrical signal is multiplied by two orthogonal reference signals C(t) and S(t) that can be broken down on the same set of frequencies as those present in $I_{mod}$, namely: C $\propto \cos(\phi_R)$*f(t) and S $\propto \sin(\phi_R)$*f(t); in that
  the temporal amplitude modulation function in question f(t) is periodic of period $2\pi/\Omega_A$ during the integration time $t_{int}$, or constant during the integration time $t_{int}$; in that
  the temporal phase modulation function $\phi_R(t)$ in question is periodic during the integration time $t_{int}$ of period $2\pi/\Omega$; and in that
  the quantities X and Y are linked to $E_S*\cos(\phi_S)$ and $E_S*\sin(\phi_S)$ by two proportionality coefficients determined analytically or digitally.

In particular, the known temporal modulation functions $\phi_R(t)$ and f(t) are used for producing the two reference signals making it possible to extract the amplitude and phase of the signal sought with an optimum signal to noise ratio.

"Optimum" means that the entire spectral content of $I_{mod}$ is used to obtain the amplitude and phase information. The signal to noise ratio is therefore increased compared with an extraction method based on the use of multiple synchronous detectors (MSDs). This improvement depends on the form of the modulation function $\phi_R$ and in particular its amplitude. The detection limit (equivalent noise power) can thus be reduced by approximately 30% compared with the case where two synchronous detectors would be used in the case of a sinusoidal modulation function $\phi_R$ of low amplitude. The improvement is much greater if the amplitude of the modulation function is high.

Advantageously, the known temporal modulation functions $\phi_R$ and f(t) are used for producing the two reference signals making it possible to extract the amplitude and phase of the signal sought with an optimum signal to noise ratio.

Moreover, said known temporal modulation function $\phi_R$ is exact, imposed or measured.

Advantageously, the known temporal modulation function $\phi_R(t)$ is sinusoidal.

Furthermore, the known temporal modulation function $\phi_R(t)$ is triangular.

In particular, the triangular modulation function is symmetric or asymmetric.

Advantageously, the periodic modulation function f(t) in question is reduced to a single sinusoidal component of period $2\pi/\Omega_A$, without any harmonic.

Furthermore, the signal $I_{det}$ and/or the reference signals C(t) and S(t) are filtered of their continuous component or of certain frequency components just before the multiplication step.

The invention also concerns the application of the extraction method defined above in interferometric circuits. In particular, in the field of optical sensors and optical microscopy and in particular in optical near-field microscopy, whatever the wavelength used.

Interferometric circuits that comprise a local probe microscope are relevant to the invention, in particular when the angular amplitude modulation frequency $\Omega_A$ is a harmonic of the mechanical oscillation angular frequency of the probe.

The invention also concerns the application of the method where the amplitude of the modulation function of $\phi_R$, referred to as the modulation depth a, can be chosen to filter the contribution of certain undesired modulated components possibly present in said signal, typically at the angular frequency $\Omega_A$ and the harmonics thereof. Optionally, the amplitude modulation function f(t) may contain several harmonics, that is to say a set of sinusoidal signals at the angular frequencies that are multiples of $\Omega_A$.

The invention also concerns the application of the method for collecting information on the local interaction existing between the probe and the sample.

The invention also concerns the use of the method for effecting a phase-resolved Fourier analysis in the Fourier plane of a lens.

The invention relates to the execution of the method in interferometric circuits using analogue components or digital cards, or by means of software solutions.

BRIEF DESCRIPTION OF THE FIGURES

Other features, details and advantages of the invention will emerge from a reading of the following description, with reference to the accompanying figures, which illustrate.

DETAILED DESCRIPTION

For many optical sensors and instruments, it is important to be able to make precise and rapid phase measurements at low cost. Among the large number of known interferometric modulation/demodulation techniques, described for example in reference [1] "S Yin, P Ruffin, F T S Yu, Fibre Optic Sensors (CRC Press, Boca Raton, 2008)", phase modulations based on the vibration of optical mirrors, piezoelectric fibre stretchers, and other non-linear phase modulators are particularly interesting, in particular in the context of phase-resolved optical microscopy and optical near-field imaging described in references [2, 3, 4] "2. P S Carney, B Deutsch, A A Govyadinov, and R Hillenbrand "Phase in nanooptics" ACS Nano; 3. N Ocelic, A Huber and R Hillenbrand, "Pseudoheterodyne detection for background-free near-field spectroscopy"; and 4. M Vaez-Iravani, and R Toledo-Crow, "Phase contrast and amplitude pseudoheterodyne interference near field scanning optical microscopy," Appl. Phys. Lett. 62, 1044-1046 (1993)."

In particular, the advantages of mirror-based modulation compared with acousto-optical frequency modulators (heterodyne with a fixed frequency offset $f_0$) are: a low cost, great simplicity of use, low noise and excellent achromaticity, which is necessary for spectroscopic applications.

The general principle (of phase modulation interferometry) consists of modulating the phase in the reference arm of the interferometer by adding a variable delay length and measuring the resulting interferences. When the phase modulation is linear, a linear harmonic beating with the signal of the reference arm occurs and any change of phase in the signal arm involves a phase advance or a phase delay, which can be recorded with an electronic phase meter. Because a phase modulation can be described as a Doppler frequency modulation, such methods are often designated pseudo-heterodynes although this term was initially used to describe a detection system where the optical source itself is frequency modulated, cf. reference [5, 6] "D. A. Jackson, A. D. Kersey, M. Corke, and J. D. C. Jones, "Pseudoheterodyne detection scheme for optical interferometers," Electronic Lett. 18, 1081-1083 (1982)" and "R. I. Laming, M. P. Gold, D. N. Payne, and N. A. Halliwell, "Fibre-optic vibration probe," Electronic Lett. 22, 167-168 (1986)" or phase modulated, cf. reference [7] "A. D. Kersey, A. C. Lewin, and D. A. Jackson "Pseudo-heterodyne detection for the fiber gyroscope," Electronic Lett. 20, 368-370 (1984)" in asymmetric interferometers. As it is much easier to obtain a sinusoidal phase modulation of the type $\phi_R(t)=a\cdot\sin(\Omega t)$ by vibrating a mirror, or stretching a fibre, rather than a linear phase modulation of the type $\phi_R(t)=\Omega t$, the pseudo-heterodyne methods have been generalised to such a non-linear periodic phase modulation. However, in these cases, the detected intensity has many harmonics, at frequencies $n\Omega$ with n integer, and the phase cannot be recovered by a single conventional synchronous detector.

Various approaches have been proposed to solve this problem, in particular in the context of optical fibre sensors [8, 9] and near-field optics [4, 10, 3] where the signal $I_{mod}$ is particular weak and has a "supplementary amplitude modulation". For a sinusoidal modulation function $\phi_R(t) =a\cdot\sin(\Omega t)$, synchronous detections on at least two characteristic frequencies present in the detected signal (MSD) were used successfully in references [3, 13], "N. Ocelic, A. Huber, and R. Hillenbrand, "Pseudoheterodyne detection for background-free near-field spectroscopy," Appl. Phys. Lett. 89, 101124 (2006)" and in the international application WO 2007/039210 A12006. However, the useful signal being extended over a larger number of frequencies, more effective or simpler methods are considered in references [11, 12, 13].

The present invention concerns a general method for obtaining the phase and amplitude information contained in an electrical signal $I_{det}$ containing a modulated part $I_{mod}$ described above, by means of a so-called "generalised" synchronous detector, subject matter of the present invention, in order to simplify the extraction of these two quantities and to optimise the signal to noise ratio. The change compared with a conventional SD consists of using the signals C(t) and S(t), which contain all the frequencies of interest in place of the cosine and sine terms in equations (1 and 2).

It is a case advantageously of determining, in an optimum and practical manner, the amplitude and phase of a weak signal associated with non-sinusoidal stationary carriers.

The generalised synchronous detector (that is the subject matter of the present invention) can be applied to an electrical signal changing over time and having the following form:

$$I_{det}=I_{mod}+(I'_{mod}+cte) \quad (3)$$

where $I_{mod}$ is described previously in paragraph 8. $I_{mod}$ may have one or other of the forms (a) and (b) mentioned previously. Form (b) is said to have a supplementary amplitude modulation. The signal $I'_{mod}$, possibly nil, is modulated at frequencies that are generally different from those contained in $I_{mod}$, and the term "cte" corresponds to a constant term (possibly nil). The noise inherent in any signal is added to these terms.

Figure 1:
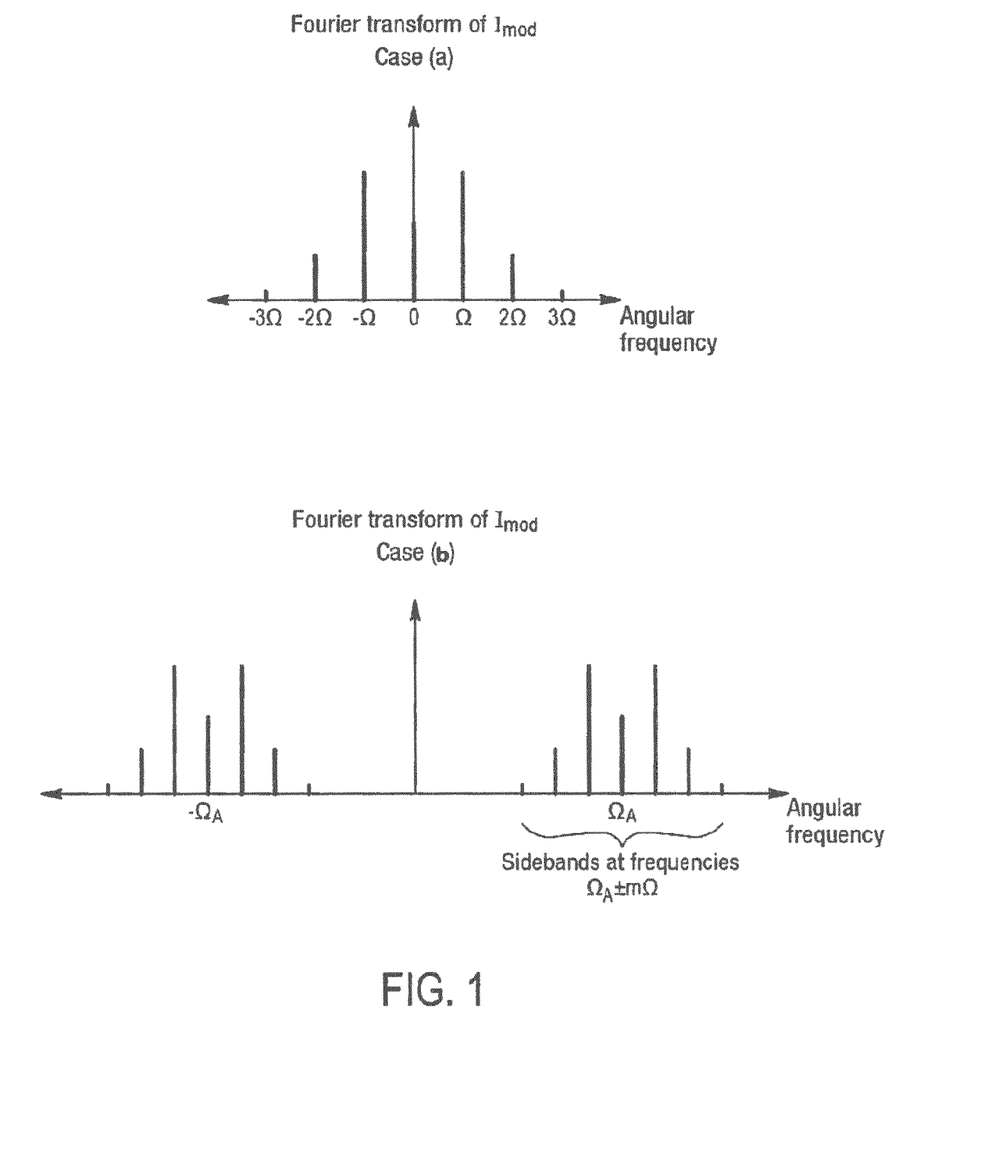
FIG. 1 illustrates the spectral content of $I_{mod}$ in the case of a type a and type b signal, in the case of a given periodic modulation function $\phi_R(t)$ of period of $2\pi/\Omega$. For the type b signal, f(t) is harmonic of period $2\pi/\Omega_A$.

To illustrate the trend of the spectra associated with $I_{mod}$ in these two cases (a) and (b) described in paragraph 8, FIG. 1 presents schematically an example of Fourier transforms of the signals of type a and b in the case of a given periodic modulation function $\phi_R$ of period $2\pi/\Omega$. In case (a), the spectrum of $I_{mod}$ has frequency components at $\Omega$ and its harmonics; let the frequencies be $m\Omega$ with m integer, some of these components may be nil. In case (b) these components appear to be sidebands around the amplitude modulation frequency in question $\Omega_A$. In both cases (a) and (b), $I_{mod}$ may be written in the form equivalent to:

$$I_{mod} \propto E_S(\cos(\phi_S)*C+\sin(\phi_S)*S) \quad (4)$$

where the expressions of C(t) and S(t) differ depending on whether the case of the first modality (a) or of the second modality (b) applies, as mentioned previously (cf. paragraph 8). $E_S$, $\cos(\phi_S)$ and $\sin(\phi_S)$ being constant or almost constant during a measurement where the method is implemented, it can be seen that C(t) and S(t) have the same spectral content as $I_{mod}$.

Figure 2A:
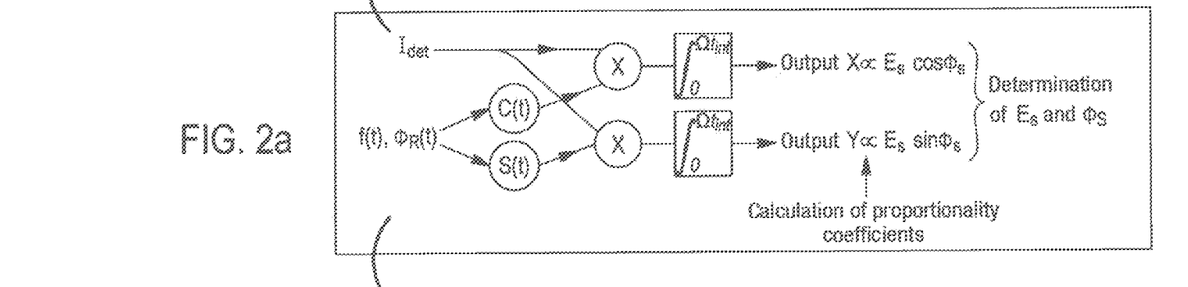
FIG. 2 is an overall view of the extraction method: a) major steps of the method (the subject matter of the present invention), b) schematic example of a possible spectrum for the signal $I_{det}$, here in the case of a signal characterised by a sinusoidal function f(t) at the angular frequency $\Omega_A$, c) schematic example of a possible spectrum for the reference signals C(t) and S(t)

The method then consists of using the signals C(t) and S(t) as reference signals in a so-called "generalised" synchronous detector comprising the following steps: multiplying the detected signal containing $I_{mod}$ by the references C(t) and S(t); then integrating this result over a certain time, so as to obtain signals X and Y proportional to $E_S \cos(\phi_S)$ and $E_S \sin(\phi_S)$; and using the output signals X and Y to determine the quantities to be extracted: $E_S$ and $\phi_S$. These various steps are shown in FIG. 2a), with a possible schematic spectrum example for $I_{det}$ (cf. FIG. 2b)) and for the reference signals C(t) and S(t) (cf. FIG. 2c)).

Advantageously, $E_S$ and $\phi_S$ are determined by analytically evaluating the integrals of the aforementioned two products, that is to say by determining an analytical expression for the outputs X and Y, for a given modulation function $\phi_R$ (sinusoidal, triangular, etc.). By means of this evaluation, the two proportionality coefficients existing between X and $E_S*\cos(\phi_S)$ on the one hand, and Y and $E_S*\sin(\phi_S)$ on the other hand, are evaluated. These two coefficients are generally different from each other and depend on the depth of modulation of the function $\phi_R$. Failing this, the integrals may be evaluated digitally to determine these coefficients.

In this method that is the subject matter of the present invention, the reference signals C(t) and S(t) are constructed from the modulation function $\phi_R$, which is known. Likewise, in case (b), the amplitude modulation function f(t) is optionally determined from the exact oscillation frequency of the probe $\Omega_A$, if it is not accessible directly.

The electronic extraction method constituting the invention is detailed below in the context of optical interferometry without "supplementary amplitude modulation", and with the latter. This second modality is important in the case of signals $I_{mod}$ of very low intensity as is the case in optical near-field microscopy, where a nanoprobe supplies a weak amplitude-modulated signal in the signal arm of an interferometer.

In optical interferometry, a "signal" field is described by an amplitude $E_S$, optionally modulated, and a phase $\phi_S$. It is mixed on a detector with a reference signal having a periodic phase or frequency modulation described by $\phi_R(t)$. The invention makes it possible to extract the amplitude $E_S$ and the phase $\phi_S$ in both cases: with and without amplitude modulation.

As a preliminary remark, the invention is presented in the context of interferometric measurement, but the amplitude $E_S$ and the phase $\phi_S$ may be seen as the amplitude and phase of any harmonic electrical signal that has been mixed, or multiplied, with another signal $E_r(t)$ modulated in phase or frequency.

In interferometry, at least one signal field $E_s(t)$ interferes with a reference field $E_r(t)$ on a detector. It is considered in this description that these fields oscillate at any optical frequency ω, not limited to the visible range but higher than the bandwidth of the detector. In the particular description that is given, the signal field in question can be written (1st case):

$$E_s(t) = \sqrt{2} E_S \cos(\omega t + \phi_S)$$

This field is multiplied by f(t) if there is a supplementary amplitude modulation effected on the signal field. In the case of interest where a harmonic amplitude modulation is considered, $f(t) = \cos(\Omega_A t)$, and the signal field is written (2nd case):

$$E_s(t) = \sqrt{2} E_S \cos(\Omega_A t) \cos(\omega t + \phi_S)$$

In these two cases, $E_S$ and $\phi_S$ are referred to as amplitude and phase of the field $E_S(t)$. The reference field can be written:

$$E_r(t) = \sqrt{2} E_R \cos(\omega t + \phi_R)$$

where the phase $\phi_R$ changes in all the cases that we will consider according to a certain modulation function $\phi_R(t)$ produced typically by a phase modulator or a modulation of the frequency. The optical intensity detected by the detector is transformed into an electrical signal corresponding to:

$$I_{det} \propto \langle (E_S(t) + E_r(t))^2 \rangle$$

where the straight brackets symbolise an average over a time related to the bandwidth of the detector.

1. Case without Supplementary Amplitude Modulation

In this case, the detected electrical signal described in equation (3) is produced by interference of the reference and signal field on a detector and is typically written:

$$I_{det} \propto E_S^2 + E_R^2 + 2 E_R E_S \cos(\phi_S - \phi_R) \quad (5)$$

In the present case, the phase $\phi_R(t)$ varies generally at a much higher speed than the expected variation of the two quantities $E_S$ and $\phi_S$. The intensity measured in a sufficiently short time can then be written as the sum of a constant or almost constant term and a modulated term such that $$I_{det} \propto I_0 + I_{mod}, \quad (6)$$

with $I_0$ equivalent to the constant term during the measurement, and $$I_{mod} = 2 E_R E_S [\cos(\phi_S) \cos(\phi_R) + \sin(\phi_S) \sin(\phi_R)], \quad (7)$$

The term $I_{mod}$ can be broken down on the base ($\cos(\phi_R)$, $\sin(\phi_R)$). An ideal means for determining the amplitude and phase is then to obtain a linear phase variation $\phi_R = \Omega t$, and then to effect a synchronous detector by multiplying the detected signal by the two reference orthogonal harmonics, $\sin(\Omega t)$ and $\cos(\Omega t)$, and finally to integrate over a sufficient time. Such operations are advantageously performed by a synchronous detector; and the amplitude $E_S$ and the phase $\phi_S$ are directly derived from the following two output signals:

$$X_\Omega(I_{det}) = \frac{1}{\Omega t_{int}} \int_0^{\Omega t_{int}} I_{det} \cos(\Omega t) d(\Omega t) = E_S E_R \cos(\phi_S) \quad (8)$$

$$X_\Omega(I_{det}) = \frac{1}{\Omega t_{int}} \int_0^{\Omega t_{int}} I_{det} \sin(\Omega t) d(\Omega t) = E_S E_R \sin(\phi_S). \quad (9)$$

where $t_{int}$ is the integration time.

Unfortunately, implementing a purely linear phase variation, using phase modulators, is not possible since the latter necessarily have a finite phase modulation range. A well known approach for overcoming this difficulty is to use a serrodyne modulation or, in other words, to use a sawtooth modulation of the optical path in the reference arm. A quasi-harmonic modulation of $I_{det}$ is then obtained if the full amplitude of the sawtooth corresponds to an integer number n times 2π (for example, an optical path modulation of nλ). Although this approach works, some errors are caused because of the not insignificant flyback time at the end of the sawtooth modulation. Consequently serrodyne modulation is not greatly recommended for rapid and precise experiments and, in many cases, a sinusoidal function $\phi_R = a \sin(\Omega t)$ is necessary (the maximum modulation amplitude a is referred to as the modulation depth). In the latter case, the Fourier spectrum of $I_{det}$ has harmonic bands lateral to the radial frequencies mΩ. The amplitudes of these side bands are obtained using the Jacobi-Anger expansion of $\cos(\phi_R)$, when m is even, and $\sin(\phi_R)$ with m only odd. A synchronous detection at the harmonic mΩ gives:

$$X_{m\Omega}(I_{det}) = 2E_R E_S \cos(\phi_S) \begin{vmatrix} J_m(a) & \text{for } m \text{ even} \\ 0 & \text{for } m \text{ odd} \end{vmatrix} \quad (10)$$

$$Y_{m\Omega}(I_{det}) = 2E_R E_S \sin(\phi_S) \begin{vmatrix} 0 & \text{for } m \text{ even} \\ J_m(a) & \text{for } m \text{ odd} \end{vmatrix} \quad (11)$$

where $J_m$ is the Bessel function of rank m.

As the signal is distributed over several harmonics, it is necessary to effect a synchronous detector on at least two of the harmonics (even and odd) in order to recover amplitude and phase information. Some precautions must be taken as to the choice of the best value of a, since a given modulation amplitude may lead to a high value of $J_m$ for m odd, but a small value for m even, and vice versa. In addition, the number of harmonics is theoretically infinite for such a phase modulation (in practice, most of the energy is concentrated on a more or less large number of harmonics according to the modulation depth). This involves a degradation of the signal to noise ratio even if more than two SDs are used, especially if the modulation depth is great.

Thus $E_S$ and $\phi_S$ can be determined by the present invention. This is because one of the interests of the present invention is that the intensity detected is not multiplied by two orthogonal harmonic references such as $\sin(m\Omega t)$ and $\cos(m\Omega t)$, and this for several harmonics m. According to the invention, the signal is simply multiplied by two orthogonal references having directly the same set of harmonic frequencies as $I_{mod}$, called C(t) and S(t), and which are written, in modality (a) considered here: $C(t) \cos(\phi_R)$ and $S(t) \sin(\phi_R)$. The result of these operations is integrated over a sufficient length of time. In this way, all the power available in $I_{mod}$ is used to recover the field information of the signal whatever the amplitude a and the phase modulation function in question $\phi_R$. In the same way, numerous phase modulation functions can be envisaged, namely sinusoidal, triangular, symmetric or asymmetric functions. Moreover, as in the case of conventional serrodyne or heterodyne modulation, the above operation can be performed with a multiplier and an electronic integrator, with $\cos(\phi_R)$ for the reference signal X, and $\sin(\phi_R)$ for the reference signal Y:

$$X_{\phi_R}(I_{det}) = \frac{1}{\Omega t_{int}} \int_0^{\Omega t_{int}} I_{det} \cos(\phi_R) d(\Omega t), \quad (12)$$

$$Y_{\phi_R}(I_{det}) = \frac{1}{\Omega t_{int}} \int_0^{\Omega t_{int}} I_{det} \sin(\phi_R) d(\Omega t). \quad (13)$$

In the advantageous case of a sinusoidal modulation $\phi_R = a \sin(\Omega t)$, the above two integrals have known analytical solutions based on the integral representation of the Bessel function (cf. reference [13]).

By ignoring, initially, the constant term $I_0$ present in $I_{det}$ (cf. eq 6), that is to say by considering that it can be subtracted, the following equations are obtained for the outputs X and Y:

$$X_{a\sin(\Omega t)}(I_{mod}) = E_R E_S (1 + J_0(2a)) \cos(\phi_S), \quad (14)$$

$$Y_{a\sin(\Omega t)}(I_{mod}) = E_R E_S (1 - J_0(2a)) \sin(\phi_S), \quad (15)$$

where $J_0$ is the zero-order Bessel function. The phase and amplitude can then be recovered from these two equations. If the modulation depth a can be adjusted, it is convenient to choose a value of a such that $J_0(2a) = 0$ (for example, for a~1.20 rad, a~2.76 rad). The outputs X and Y given by (14-15) are then identical to the perfect serrodyne case, as in the above equations 8 and 9.

Figure 3A:
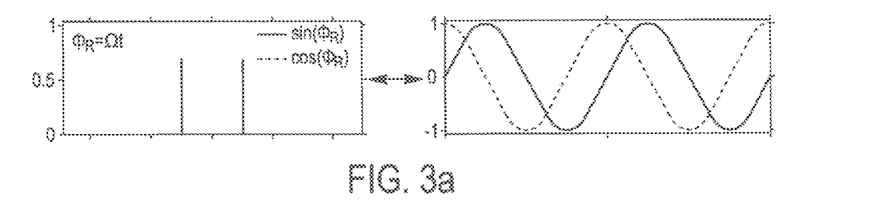
FIG. 3 shows orthogonal reference signals (cos $\phi_R$, sin $\phi_R$) and the Fourier transform thereof for the selected phase modulations $\phi_R(t)$: (a): sawteeth with an amplitude $2\pi$ and (b): sinusoidal with a modulation depth $a_1$ corresponding to the first zero of $J_0$ and (c): triangular with an amplitude of $\pi/2$ radian.
Figure 3B:
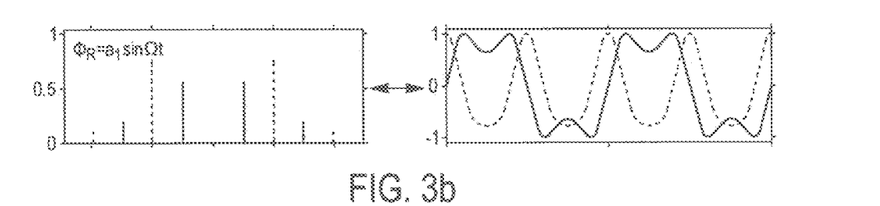
Figure 3C:
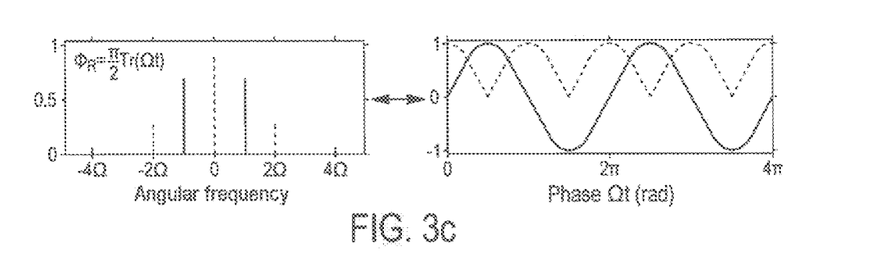

FIG. 3 presents examples of orthogonal references C(t) and S(t) for various modulation functions $\phi_R$: in the serrodyne case (3a), for a sinusoidal modulation function (3b), and for a triangular modulation function (3c). In the case of FIG. (3a), $\phi_R$ is equal to $\Omega t$ (the ideal serrodyne case). The sinusoidal phase modulation (FIG. 3b), $\phi_R$ is equal to a sin $\Omega t$, is generally the most used for phase modulators compared with other phase modulation functions. However, other forms of modulation may be considered in certain situations. In particular, for a triangular function (FIG. 3c), where $\phi_R = a*Tr(\Omega t)$, the two signals $C(t)\cos(a*Tr(\Omega t))$ and $S(t)\sin(a*Tr(\Omega t))$ can easily be implemented at low cost with analogue electronic components.

More generally, the real phase modulation $\phi_R = \phi_{real}$ may differ from the expected modulation function. This real phase modulation actually caused by the modulator can be measured in an experiment, for example by means of a piezoelectric modulator provided with strain gauges or other movement sensors. Empirically, the same approach may also be used in this case: the integrals (12 and 13) are digitally evaluated with the measured function $\phi_R(t)$ in order to use, in the best way possible, the outputs X and Y and extract amplitude and phase. In this approach the two proportionality coefficients connecting X and Y to $E_S*\cos(\phi_S)$ and $E_S*\sin(\phi_S)$ are therefore evaluated digitally. This approach may also be conducted, without difficulty, in the presence of a supplementary amplitude modulation.

Moreover, even if it is possible to obtain $I_{mod}$ by subtracting $I_0$ from $I_{det}$, such an operation complicates the experimental circuit, unless the signal $E_P^2$ is sufficiently small to consider that $I_0$ is equal to approximately $E_R^2$. The constant term $I_0$ is easily eliminated by a simple high-pass filter placed before the generalised synchronised detector. However, such filters may affect $I_{mod}$ since the reference $\cos(\phi_R)$ may have a not insignificant continuous component, as can be seen in figure (3c). This is also the case with a sinusoidal modulation $\phi_R$ if an arbitrary amplitude a is considered (cf. equations 10 and 11) with m=0). For this reason, it is useful to evaluate the outputs delivered by the generalised synchronous detector proposed for a detected signal filtered of its continuous component $\tilde{I}_{det}$. In this case the solution is again analytical and is written:

$$X_{a\sin(\Omega t)}(\tilde{I}_{det}) = E_R E_S (1 + J_0(2a) - 2J_0^2(a)) \cos(\phi_S) \quad (16)$$

$$Y_{a\sin(\Omega t)}(\tilde{I}_{det}) = E_R E_S (1 - J_0(2a)) \sin(\phi_S) \quad (17)$$

where ($E_S$, $\phi_S$) can be recovered directly from these equations. We note that, for 2a corresponding to a $k^{th}$ zero of $J_0$, the term $J_0^2(a)$ is small for k even, and especially for the high values of k, so that the outputs are once again similar to equations (8 and 9). The corresponding expressions for a triangular modulation $\phi_R(t) = aTr(\Omega t)$, where a is the modulation depth, and Tr is a triangular function ranging from −1 to 1 in phase with $\sin(\Omega t)$, are:

$$X_{aTr(\Omega t)}(I_{mod}) = E_R E_S \cos(\phi) \left(1 + \frac{\sin(a)\cos(a)}{a}\right) \quad (18)$$

$$Y_{aTr(\Omega t)}(I_{mod}) = E_R E_S \sin(\phi) \left(1 - \frac{\sin(a)\cos(a)}{a}\right) \quad (19)$$

and $$X_{aTr(\Omega t)}(\tilde{I}_{det}) = E_R E_S \cos(\phi)\left(1 + \frac{\sin(a)\cos(a)}{a} - \frac{2\sin^2(a)}{a^2}\right) \quad (20)$$

$$X_{aTr(\Omega t)}(\tilde{I}_{det}) = E_R E_S \sin(\phi)\left(1 - \frac{\sin(a)\cos(a)}{a}\right) \quad (21)$$

Analysis of the coefficients linking the outputs X, Y to $E_s^*\cos(\phi_S)$ and $E_s^*\sin(\phi_S)$ respectively show also that a form identical to the perfect serrodyne case (equations 8 and 9) is obtained for certain modulation depths a.

It should be noted that it is also possible to filter the reference signals C(t) and S(t) of their continuous component instead of filtering the input signal, which leads to the same results.

2. Case with a Supplementary Amplitude Modulation in the Signal Arm

The situation where the amplitude of the signal field is also modulated, at an angular frequency $\Omega a$, is now considered. This supplementary amplitude modulation is particularly interesting in the case of very weak signals, and makes it possible to dispense with undesirable coherent lights (non-modulated) arriving at the detector in addition to the signals corresponding to $E_S$ and $E_R$. This approach is in particular used successfully in optical near-field microscopy where heterodyne and pseudo-heterodyne interferometric detection circuits are used to determine the amplitude and phase of the field diffused by oscillating nanoprobes in intermittent contact with the surface of a sample. In such experiments, the angular frequency $\Omega_A$ of the amplitude modulation is typically greater by a few orders of magnitude with respect to the fundamental angular frequency $\Omega$ associated with the phase modulation $\phi_R$. To simplify the mathematical description, we note $\Omega_A = n\Omega$, where n is generally much greater than 1. The part of the field of the signal modulated at $\Omega_A$ by the diffusing probe can be noted:

$$E_p(t) = \sqrt{2}E_P \cos(n\Omega t)\cos(\Omega t + \phi_S)$$

With this expression, the modulated useful term, $I_{mod}$, of equation (7) is now:

$$I_{mod} = 2E_R E_P \cos(n\Omega t)\cos(\phi_R - \phi_S), \quad (22)$$

where $E_P$ corresponds to the amplitude of the sought signal previously denoted $E_S$. This last equation can again be written:

$$I_{mod} = E_R E_P \cos(n\Omega t + \phi_R - \phi_S) + E_R E_P \cos(n\Omega t - \phi_R + \phi_S), \quad (23)$$

to emphasise the presence of sidebands at higher and lower frequencies $n\Omega$, and to facilitate the calculations of the following integrals. In the expression of the detected signal $I_{det}$ there is added to $I_{mod}$ the term:

$$I_0 = cte + E_P^2 \cos^2(n\Omega t) \quad (24)$$

which does not carry any information on the phase, and presents a modulation at the frequency 0 and $2n\Omega$ only. Consequently, we can ignore $I_0$ since the reference signals C(t) and S(t) do not contain these frequencies in their spectrum. As before, the intensity detected is multiplied by the two orthogonal reference signals, $C(t) = 2\cos(n\Omega t)\cos\phi_R$ and $S(t) = 2\cos(n\Omega t)\sin\phi_R$. These have the same set of frequencies as $I_{mod}$, contained in $I_{det}$, and we integrate in order to obtain:

$$X_{n\Omega t \pm \phi_R}(I_{det}) = \frac{1}{\Omega t_{int}}\int_0^{\Omega t_{int}} I_{det} C(t) d(\Omega t) \propto E_S \cos(\phi_S), \quad (25)$$

$$Y_{n\Omega t \pm \phi_R}(I_{det}) = \frac{1}{\Omega t_{int}}\int_0^{\Omega t_{int}} I_{det} S(t) d(\Omega t) \propto E_S \sin(\phi_S). \quad (26)$$

where C(t) and S(t) can be developed respectively into $\cos(n\Omega t + \phi_R) + \cos(n\Omega t - \phi_R)$ and $\sin(n\Omega t + \phi_R) - \sin(n\Omega t - \phi_R)$. In the case of a sinusoidal phase variation, the two integrals are then simple analytical solutions obtained from the integral representation of the Bessel functions of order n:

$$X_{n\Omega t \pm a\,\sin(\Omega t)}(I_{det}) = E_R E_P \cos\phi_S(1 + J_{2n}(2a) + J_0(2a)), \quad (27)$$

$$Y_{n\Omega t \pm a\,\sin(\Omega t)}(I_{det}) = E_R E_P \sin\phi_S(1 - J_{2n}(2a) - J_0(2a)). \quad (28)$$

where ($E_P$, $\phi$) can be recovered directly from these equations.

We note that $J_{2n}(2a)$ is in fact negligible for a high value of n and for a reasonable phase modulation amplitude a (for example for n=10 and a<$\pi$, where n=20 and a<6$\pi$). It is therefore advantageous in this case to choose a small phase modulation, such that $J_0(2a)=0$, so that the outputs are once again identical to the perfect serrodyne case given by equations (8 and 9).

Still in the case of a supplementary amplitude modulation, we will consider now that we can have a coherent (undesired) additional background field, arriving at the detector in the form:

$$E_{bg}(t) = \sqrt{2}E_{Bg}\cos(\omega t + \phi_{Bg})$$

This third field $E_{bg}$, of constant amplitude and phase, may interfere with the signal field $E_p(t)$ and thus give a supplementary intensity term modulated at the radial frequency $n\Omega$:

$$I_{mod}^{bg} = 2E_{Bg}E_P \cos(n\Omega t)\cos(\phi_{Bg} - \phi_S). \quad (29)$$

Since C(t) and S(t) also have frequency components at $n\Omega$, we can evaluate the contribution of these terms in the synchronous detector by:

$$X_{n\Omega t \pm \phi_R}(I_{mod}^{bg}) = \frac{1}{\Omega t_{int}}\int_0^{\Omega t_{int}} I_{mod}^{bg} C(t) d(\Omega t) \quad (30)$$

$$Y_{n\Omega t \pm \phi_R}(I_{mod}^{bg}) = \frac{1}{\Omega t_{int}}\int_0^{\Omega t_{int}} I_{mod}^{bg} S(t) d(\Omega t). \quad (31)$$

Still considering a sinusoidal phase modulation $\phi_R(t)$, it is found that the contributions of these two integrals are in fact proportional to $J_{2n}(a) + J_0(a)$. From this result, we see that the contribution of the undesirable terms modulated at the angular frequency $\Omega_A = n\Omega$ can be cancelled out by adjusting the modulation depth of $\phi_R$, a, so that it corresponds to a zero of the Bessel function, where $J_{2n}(a)$ will be extremely low for a sufficiently high value of n.

It should be noted that the undesired supplementary interference term between $E_{bg}(t)$ and $E_r(t)$, and the autointerference term proportional to $E^2_{bg}$, are not modulated at $n\Omega$ nor at any of the frequencies present in the functions C and S. They are therefore filtered naturally without any special precaution.

3. Practical Tests and Applications

Figure 4A:
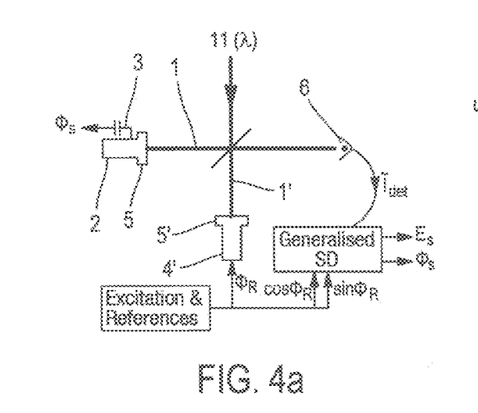
FIG. 4 illustrates experimental devices developed to test the generalised synchronous detector technique that is the subject matter of the present invention. A Michelson interferometer is used in two modalities: in (a), without amplitude modulation, and in (b), with a modulation of the signal in the signal arm. In the second case (b), the interferometer is coupled to an optical near-field microscope and the signals f(t) and $\phi_R(t)$ are used to construct C(t) and S(t) in the generalised SD.

FIG. 4 presents a de Michelson interferometer constructed in order to evaluate the validity of the above approach, and for a precise phase measurement in each of the two modalities (a) and (b) mentioned. The first configuration of FIG. 4(a) concerns the first modality (a). An infrared laser source 11 is used. A mirror 5 is mounted on a piezoelectric crystal 2. This mirror is used in the signal arm 1 in order to obtain controllable changes to the phase of $\phi_S$, monitored by means of a capacitive movement sensor 3. For demonstration purposes, a reference mirror 5' mounted on a second piezoelectric crystal 4' is excited sinusoidally at an arbitrary angular frequency of 200 π rad Hz and at an arbitrary amplitude corresponding to a=2.4 rad. The detected signal $I_{det}$ is filtered by a high-pass filter 6, and the resulting signal $\tilde{I}_{det}$ is sampled, in this example, with a 16-bit acquisition card. The generalised synchronous operation expressed by equations (12 and 13) is performed digitally in real time, using LabVIEW software. This electronic method produces the outputs X and Y linked to $E_S*\cos(\phi_S)$ and $E_S*\sin(\phi_S)$ by the proportionality coefficients, determined analytically, appearing in equations (16 and 17). The trivial resolution of this equation system gives access to the phase $\phi_S$ and to the amplitude variations $E_S$. The same result could be obtained by means of other similar software acquisition cards, such as FPGA (Field-Programmable Gate Array) cards, or analogically. The proportionality coefficients can also be determined digitally, for various modulation functions.

Figure 5:
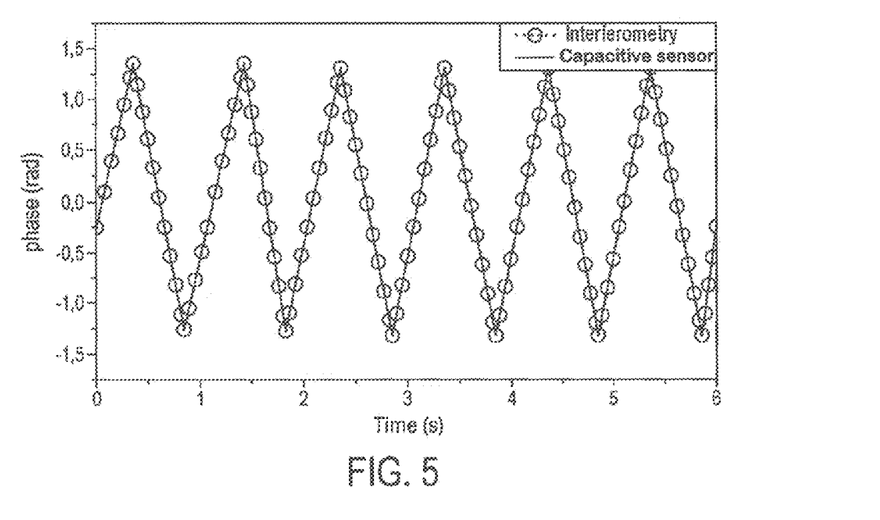
FIG. 5 shows an example of phase measurement $\phi_S$ obtained with the configuration of FIG. 4(a), with a sinusoidal vibration of the reference mirror and therefore of $\phi_R$. The phase of the signal field $\phi_S$ follows a triangular function controlled by capacitive sensors (thick line). The simultaneous interferometric measurement obtained with an integration time $t_{int}$ of 0.05 s is marked by circles.

FIG. 5 indicates the phase measurements obtained by this method for a symmetrical triangular movement of the mirror signal. Good agreement is observed with the actual phase change that was obtained by the movement sensor.

Figure 4B:
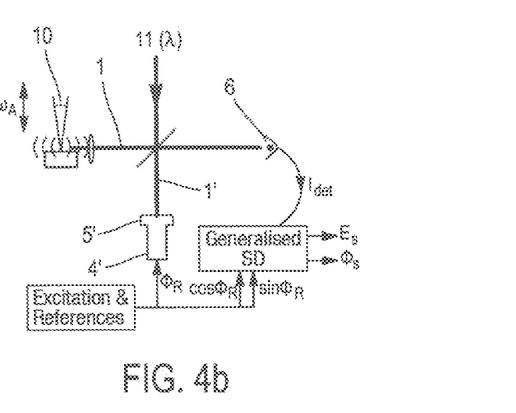

In the second configuration illustrated by FIG. 4(*b*), the signal field is amplitude modulated. This is particularly useful for extracting a very weak signal of the noise. This configuration corresponding to the second modality (b) is here used for an optical experiment in near field where the light diffused periodically by a nanoprobe 10 interferes with the reference field. A high-resolution (22 bit) acquisition card is preferably used for digitally implementing the generalised SD, with a performance level of high numeric quality. The generalised synchronous operation expressed by equations (25 and 26) is performed digitally in real time, using LabVIEW software. This electronic method produces the outputs X and Y linked to $E_S*\cos(\phi_S)$ and $E_S*\sin(\phi_S)$ by the proportionality coefficients determined analytically in equations (27 and 28). Trivial resolution of this system of equations gives access to the phase $\phi_S$ and to the amplitude variations $E_S$. An infrared laser 11 emitting a near wavelength of 10.1 μM with a power that is rather low but very stable of around 10 mW, is used. More details on the optical system itself are described in reference [12].

Figure 6:
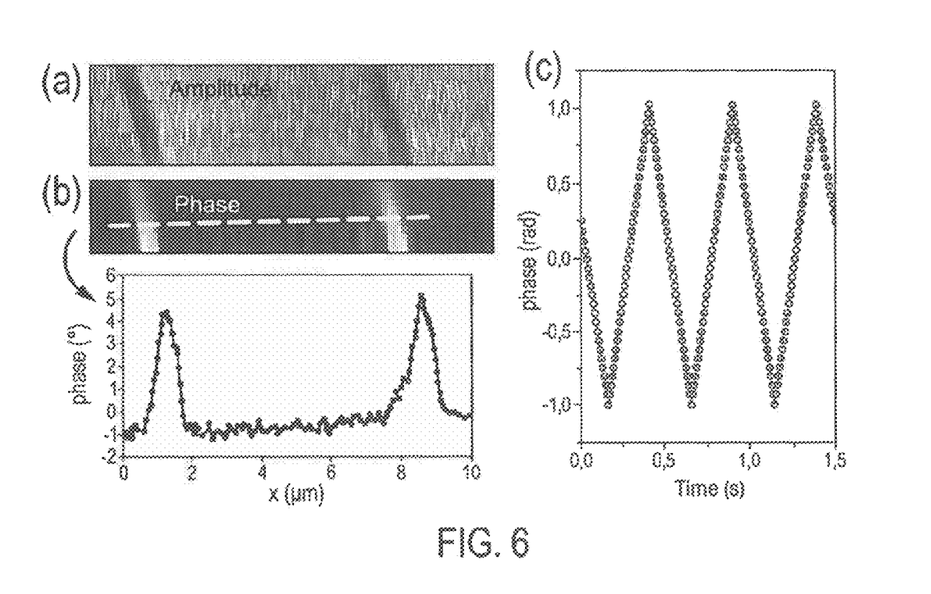
FIG. 6 shows a measurement of amplitude Es and phase $\phi_R$ obtained with the device of FIG. 4(b). 6(a) shows the amplitude and 6(b) shows the phase of the field of the signal diffused by the nanoprobe on copper lines, appearing in the form of dark lines on the amplitude image. 6(c) shows the phase recorded during a triangular phase modulation of around 0.1 rad added to the signal arm, amplitude modulated.

FIG. 6(*a,b*) presents an example of phase measurement obtained with the device of FIG. 4(*b*) at various points of a sample. To test and evaluate the quantity of the phase measurement in this second mode, a bare oscillating tuning fork was also moved from front to rear in a controlled triangular movement (±0.80 μm corresponding to ±1.0 rad) in the signal arm of FIG. 4(*b*), in place of the nanoprobe. The measurement of the phase of the field diffused by this system modulating the amplitude of the signal field is shown in FIG. 6(*c*). The images in FIG. 6 (*a,b*) were obtained on a network of copper lines integrated in silicon. The traces of the two copper lines imaged are clearly visible, both on the amplitude (black lines) and on the phase (light lines). This result demonstrates the ability of the invention to determine the amplitude and phase of a field derived from an optical near-field probe, affording imaging resolved in phase at sub-wavelength scales, in the presence of an optional background field.

Figure 7A:
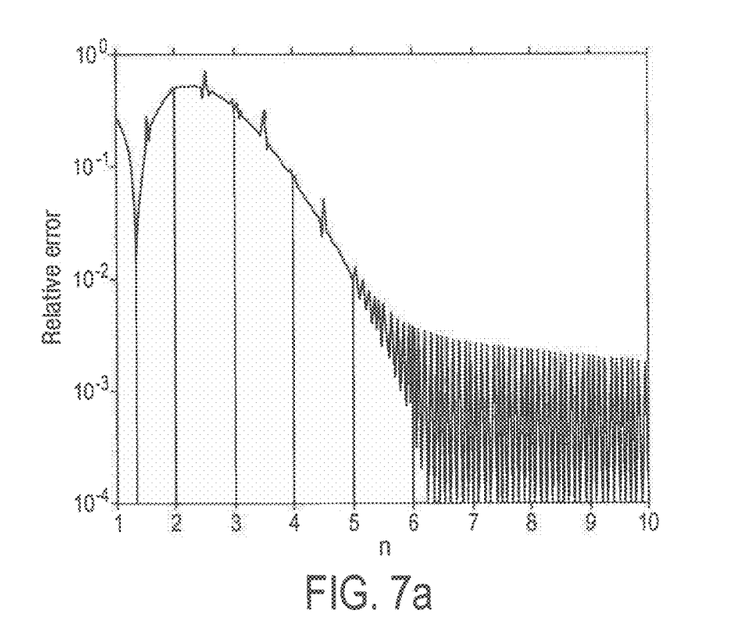
FIG. 7 shows, at (a), an example of relative error simulated on the phase committed using the "generalised synchronous detector" for increasing values of n. The simulation was done with $\phi_S=\pi/4$, $\Omega t_{int}=20\pi$, a sampling period equal to $2\pi/1000$, and a=3; and in (b), the attenuation of the background field for increasing values of a for a background field identical, in amplitude, to the signal field. In this simulation, n=30, $\Omega t_{int}=20\pi$, and the sampling period is equal to $2\pi/1000$, the background contribution falls to zero, for a corresponding to a zero of $J_0(a)$ or for n large.

In these experiments, the amplitude modulation frequency is here imposed by the experimental resonant frequency $\Omega_A \simeq 60\pi$ rad kHz of the tuning fork on which the nanoprobe is stuck in order to function in intermittent contact mode (cf. FIG. 4*b*). The oscillation of the probe is put in phase with an excitation signal $e_{\Omega_A}(t)$ and the angular frequency of the vibration reference mirror is arbitrarily chosen and is equal to $\Omega=2\pi$ rad kHz with an excitation signal $e_\Omega(t)$ leading to a frequency ratio of n≃30. Although the frequency ratio $\Omega_A/\Omega$ can be adjusted to an integer value with very great precision, the benefit is in fact negligible for high values of n, as illustrated by the simulation shown in FIG. 7(*a*) showing the typical error committed on the phase according to the value, integer or not, of n.

Figure 7B:
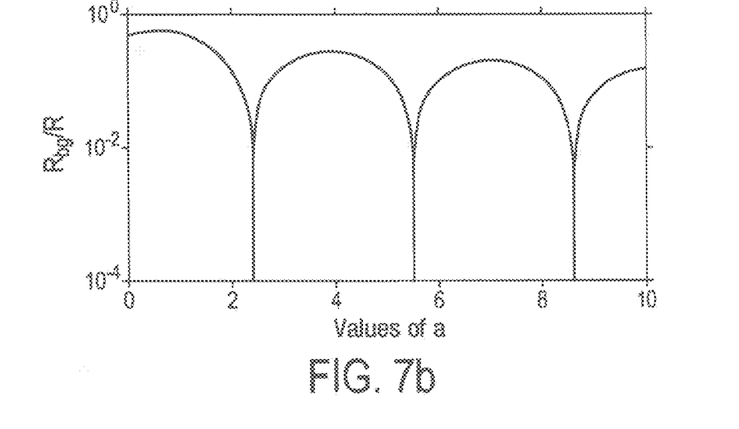

The two reference signals are constructed from the standardised excitation signal acquired with the same acquisition card:

$$C(t) = \bar{e}_{\Omega_A}(t)\cos(a\bar{e}_\Omega(t)) \tag{32}$$

$$S(t) = \bar{e}_{\Omega_A}(t)\sin(a\bar{e}_\Omega(t)), \tag{33}$$

with $\bar{e}(t) = e(t)/\max(e(t))$; and a the theoretical phase modulation depth taken at 2.404 rad in order to eliminate the contribution of the background (cf. figure (7*b*)). In practice, the real amplitude of the signal $e_\Omega(t)$ is easily adjusted so as to obtain this phase modulation with a precision of approximately 0.05 rad. To do this, the experimental phase amplitude modulation can be obtained by a sensor placed on the piezoelectric phase modulator, or obtained from the form of the detected intensity of the signal.

The method according to the invention is optimum and remarkable in that it totally uses the detailed spectrum of the beating detected between the signal and the reference, thus supplying the highest possible signal to noise ratio. The principle has been detailed for sinusoidal and triangular phase modulations and has been tested experimentally, showing both great stability and good reliability. The method was extended to amplitude modulated signals in the frequent case of a sinusoidal phase modulation. This second approach, useful in the case of experiments on very weak signals, was tested successfully in optical near-field microscopy in the medium infrared, leading to a high signal compared with noise under conditions of low lighting power. Furthermore, this second approach highlighted the conditions for obtaining effective elimination of the background light.

In optical near-field microscopy with diffusing probe, it frequently happens that part of the undesired coherent background field is modulated at the oscillation frequency of the nanoprobe $\Omega_{OSC}$. To abandon this background field, it is often possible to detect the useful signal on the harmonic frequencies $k*\Omega_{OSC}$, with k integer. The method makes it possible to perform this "filtering" operation, by choosing, to construct the functions C(t) f(t)*$\cos(\phi_R)$ and S(t) f(t)*$\sin(\phi_R)$, a function f(t) having the desired harmonic or harmonics, of example: f(t)=$\cos(\Omega_A)$ with $\Omega_A = k*\Omega_{OSC}$.

The same electronic extraction method can be employed for other nanoprobes used in optical near-field microscopy and more generally in local probe microscopy. In particular, lever probes, or probes with openings and without opening.

The method according to the present invention can be applied to various interferometric circuits, for example interferometers of the Michelson, Mach-Zehnder, Sagnac, etc. type. These interferometers can be implemented in free space, in integrated optics or by means of optical fibres, in particular with a view to application in the field of optical sensors. They may be coupled or not to microscope systems.

In certain cases, parasitic signals are present on the frequencies present in $I_{mod}$, which falsifies the amplitude and phase measurement. To get round the problem, it is possible to filter $I_{det}$ of these signals (and therefore to modify $I_{mod}$) before using the extraction method, and/or to filter the functions C(t) and S(t) of these frequencies. This is for example the case in equations (16-17), where the continuous component of $I_{det}$ is filtered.

The electronic extraction method according to the invention can be used in parallel or sequentially, when several signals $I_{det}$ of type (a) or (b) are present. This may be performed advantageously in optical interferometry when a matrix detector is used for phase resolved imaging. This method can in particular be used to effect a phase resolved Fourier analysis in the Fourier plane of a lens.

The invention concerns typically the measurement of amplitude and phase in interferometric circuits, but concerns more generally the problem of demodulation and amplification of modulated signals.

REFERENCES i. Stutt, C. A. (March 1949). "*Low-frequency spectrum of lock-in amplifiers*". MIT Technical Report (MIT) (105): 1-18.
ii. Scofield, John H. (February 1994). "Frequency-domain description of a lock-in amplifier". American Journal of Physics (AAPT) 62 (2): 129-133.
iii. Cameron C. B. "Recovering signals from Optical Fiber Interferometric sensors", PhD thesis, 1991
1. S. Yin, P. Ruffin, F. T. S. Yu, Fiber Optic Sensors (CRC Press, Boca Raton, 2008).
2. P. S. Carney, B. Deutsch, A. A. Govyadinov, and R. Hillenbrand, "Phase in nanooptics" ACS Nano, 6, 8-12 (2012).
3. N. Ocelic, A. Huber, and R. Hillenbrand, "Pseudoheterodyne detection for background-free near-field spectroscopy," Appl. Phys. Lett. 89, 101124 (2006).
4. M. Vaez-Iravani, and R. Toledo-Crow, "Phase contrast and amplitude pseudoheterodyne interference near field scanning optical microscopy," Appl. Phys. Lett. 62, 1044-1046 (1993).
5. D. A. Jackson, A. D. Kersey, M. Corke, and J. D. C. Jones, "Pseudoheterodyne detection scheme for optical interferometers," Electronic Lett. 18, 1081-1083 (1982).
6. R. I. Laming, M. P. Gold, D. N. Payne, and N. A. Halliwell, "Fibre-optic vibration probe," Electronic Lett. 22, 167-168 (1986).
7. A. D. Kersey, A. C. Lewin, and D. A. Jackson "Pseudoheterodyne detection for the fiber gyroscope," Electronic Lett. 20, 368-370 (1984).
8. A. Dandridge, A. B. Tveten, T. G. D. Giallorenzi, and G. Thomas, "Homodyne demodulation scheme for fiber optic sensors using phase generated carrier," IEEE J. Quantum Electron. V QE-18, 1647-1653 (1982).
9. B. Lee and Y. Jeong "Interrogation techniques for fiber grating sensors and the theory of fiber gratings," in Fiber Optic Sensors, S. Yin, P. Ruffin, F. T. S. Yu, eds. (CRC Press, Boca Raton, 2008), pp. 295-382.
10. S. Pilevar, W. A. Atia, and C. C. Davis, "Reflection near-field scanning optical microscopy: An interferometric approach," Ultramicroscopy 61, 233-236 (1995).
11. L. Stern, B. Desiatov, I. Goykhman, G. M. Lerman and U. Levy, "Near field phase mapping exploiting intrinsic oscillations of aperture NSOM probe," Opt. Express 19, 12014-12020 (2011), http://www.opticsexpress.org/abstract.cfm?URI=oe-19-13-12014.
12. B. Deutsch and R. Hillenbrand and L. Novotny, "Near-field amplitude and phase recovery using phase-shifting interferometry," Opt. Express 16, 494-501 (2008), http://www.opticsexpress.org/abstract.cfm?URI=oe-16-2-494.
13. N. Ocelic and R. Hillenbrand, "Optical device for measuring modulated signal light," WO 2007/039210 A12006

Figure 2B:
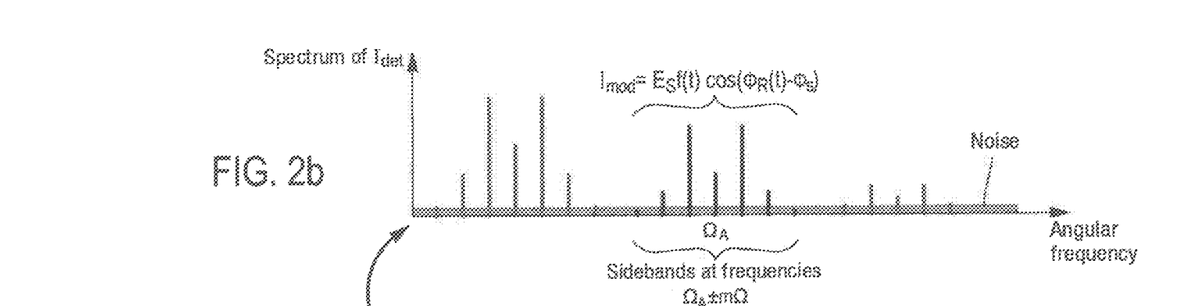
Figure 2C:
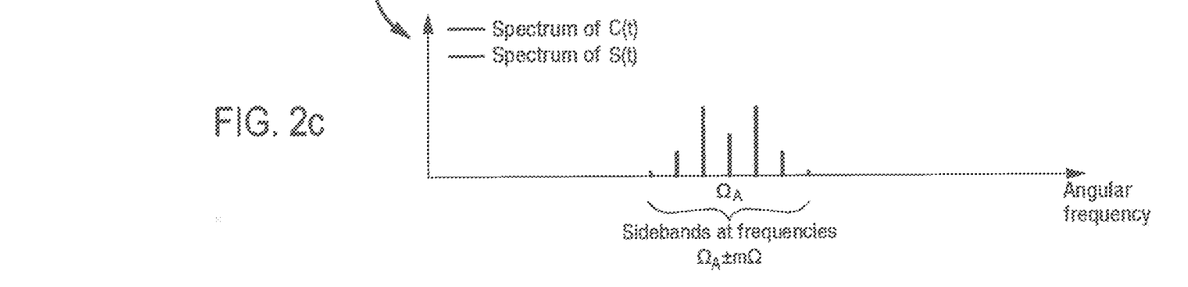

| Key to the figures | |
|---|---|
| FIG. 1 | |
| Transformée de Fourier de $I_{mod}$ cas (a) | Fourier transform of $I_{mod}$ Case (a) |
| Fréquence angulaire | Angular frequency |
| Transformée de Fourier de $I_{mod}$ cas (b) | Fourier transform of $I_{mod}$ Case (b) |
| Fréquence angulaire | Angular frequency |
| Bandes latérales aux fréquences $\Omega_A \pm m\Omega$ | Sidebands at frequencies $\Omega_A \pm m\Omega$ |
| FIG. 2b | |
| Spectre de $I_{det}$ | Spectrum of $I_{det}$ |
| Bandes latérales aux fréquences | Sidebands at frequencies |
| Bruit | Noise |
| Fréquences angulaires | Angular frequencies |
| FIG. 2a | |
| Sortie | Output |
| Calcul des coefficients de proportionalité | Calculation of proportionality coefficients |
| Détermination de $E_s$ et $\phi_s$ | Determination of $E_s$ and $\phi_s$ |
| FIG. 2c | |
| Spectre de C(t) | Spectrum of C(t) |
| Spectre de S(t) | Spectrum of S(t) |
| Bandes latérales aux fréquences | Sidebands at frequencies |
| Fréquences angulaires | Angular frequencies |
| FIG. 3c | |
| Fréquence angulaires | Angular frequency |
| Phase $\Omega$t (rad) | Phase $\Omega$t (rad) |
| FIG. 4a | |
| Excitation & References DS géneralisée | Excitation & References Generalised SD |
| FIG. 4b | |
| Excitation & References DS géneralisée | Excitation & References Generalised SD |
| FIG. 5 | |
| Interferometrie | Interferometry |
| Capteur capacitif | Capacative sensor |
| Phase (rad) | Phase (rad) |
| Temps (s) | Time (s) |
| FIG. 6 | |
| Phase (°) | Phase (°) |
| Amplitude | Amplitude |
| Phase | Phase |
| Phase (rad) | Phase (rad) |
| Temps (s) | Time (s) |
| FIG. 7a | |
| Erreur relative | Relative error |
| FIG. 7b | |
| Valeurs de a | Values of a |

The invention claimed is:

1. Electronic method for extracting the amplitude $E_S$ and phase $\phi_S$ of an electrical signal $I_{det}$ in a lock-in amplifier, said electrical signal $I_{det}$ containing a modulated part $I_{mod}$ of the form $I_{mod} \propto E_S f(t)*\cos(\phi_{S-}\phi_R(t))$, where $\phi_R(t)$ and f(t) are two known temporal modulation functions, comprising the following steps:
   multiplying said electrical signal by two reference signals C(t) and S(t) constructed from known temporal modulation functions $\phi_R(t)$ and f(t);

integrating the two signals resulting from the two multiplications defined at the previous step during a time $t_{int}$;

determining the amplitude and phase of said signal from the quantities X and Y resulting from the integrations defined at the previous step;

the method is characterised in that:

said electrical signal is multiplied by two references signals C(t) and S(t) that can be decomposed on the same set of frequencies as those present in $I_{mod}$, wherein the electrical signal $I_{det}$ is detected using a detector coupled to a signal arm and a reference arm that are optically coupled to a light source in an interferometric arrangement.

2. Electronic extraction method according to claim 1, wherein the two references signals C(t) and S(t) are defined by $C \propto \cos(\phi_R)*f(t)$ and $S \propto \sin(\phi_R)*f(t)$.

3. Electronic extraction method according to claim 2, wherein the temporal amplitude modulation function f(t) in question is periodic of period $2\pi/\Omega_A$ during the integration time $t_{int}$, or constant during the integration time $t_{int}$, and wherein the temporal phase modulation function $\phi_R(t)$ in question is periodic during the integration time $t_{int}$ of period $2\pi/\Omega$.

4. Electronic extraction method according to claim 3, wherein the quantities X and Y are linked to $E_S*\cos(\phi_S)$ and $E_S*\sin(\phi_S)$ by two proportionality coefficients determined analytically or numerically.

5. Electronic extraction method according to claim 2, in which the known temporal modulation function $\phi_R(t)$ is sinusoidal.

6. Electronic extraction method according to claim 2, in which the temporal modulation function is triangular.

7. Electronic extraction method according to claim 1, in which the known temporal modulation functions $\phi_R$ and f(t) are used for producing the two reference signals making it possible to extract the amplitude and phase of the signal of interest with an optimum signal to noise ratio.

8. Electronic extraction method according to claim 7, in which the known temporal modulation function $\phi_R(t)$ is exact, imposed or measured.

9. Electronic extraction method according to claim 1, where the periodic modulation function f(t) in question is reduced to a single sinusoidal component of period $2\pi/\Omega_A$, without any harmonic.

10. Method according to claim 1, where the signal $I_{det}$ and/or the reference signals C(t) and S(t) are filtered of their continuous component or certain frequency components just before the multiplication step.

11. Execution of the method according to claim 1 in interferometric setups using analog components or digital cards.

12. Execution of the method according to claim 1 in interferometric setups using software solutions.

13. An interferometer comprising:
a light source;
a signal arm optically coupled to the light source to receive light from the light source;
a reference arm optically coupled to the light source to also receive the light from the light source; and
a lock-in amplifier optically coupled via a detector to the signal arm and the reference arm to detect an electrical signal $I_{det}$, the electrical signal $I_{det}$ containing a modulated part $I_{mod}$ of the form $I_{mod} \propto E_S*f(t)*\cos(\phi_S-\phi_R(t))$, where $\phi_R(t)$ and f(t) are two known temporal modulation functions and where $E_s$ and $\phi_S$ correspond to amplitude and phase signals, the lock-in amplifier being programmed to:
multiply said electrical signal by two references signals C(t) and S(t) constructed from known temporal modulation functions $\phi_R(t)$ and f(t);
integrate the two signals resulting from the two multiplications defined at the previous step during a time $t_{int}$; and
determine the amplitude and phase of said signal from the quantities X and Y resulting from the integrations defined at the previous step,
wherein said electrical signal is multiplied by two references signals C(t) and S(t) that can be decomposed on the same set of frequencies as those present in $I_{mod}$.

14. The interferometer according to claim 13, wherein the two reference signals C(t) and S(t) are defined by $C \propto \cos(\phi_R)*f(t)$ and $S \propto \sin(\phi_R)*f(t)$.

15. The interferometer according to claim 14, wherein the temporal amplitude modulation function f(t) in question is periodic of period $2\pi/\Omega_A$ during the integration time $t_{int}$, or constant during the integration time $t_{int}$, and wherein the temporal phase modulation function $\phi_R(t)$ in question is periodic during the integration time $t_{int}$ of period $2\pi\Omega$.

16. The interferometer according to claim 15, wherein the quantities X and Y are linked to $E_S*\cos(\phi_S)$ and $E_S*\sin(\phi_S)$ by two proportionality coefficients determined analytically or numerically.

17. The interferometer according to claim 13, comprising furthermore a local probe microscope where the amplitude modulation angular frequency $\Omega_A$ is a harmonic of the mechanical oscillation angular frequency of the probe.

18. The interferometer according to claim 17, where the modulation depth of $\phi_R$ is chosen for filtering the contribution of certain non-desired modulated components possibly present in said signal, typically at the angular frequency $\Omega_A$ and the harmonics thereof.

19. The interferometer according to claim 17, for collecting information on the local interaction existing between the probe and a sample.

20. The interferometer according to claim 13, for performing a phase resolved Fourier analysis.

* * * * *